United States Patent [19]

Kowalski

[11] Patent Number: 4,691,736

[45] Date of Patent: Sep. 8, 1987

[54] VALVE FOR FIRE SUPPRESSION

[75] Inventor: Slawomir Kowalski, Oak Ridge, N.J.

[73] Assignee: Marotta Scientific Controls, Inc., Boonton, N.J.

[21] Appl. No.: 937,542

[22] Filed: Dec. 3, 1986

[51] Int. Cl.[4] .............................................. F16K 37/00

[52] U.S. Cl. ...................................... 137/557; 251/67; 251/68; 200/81.5

[58] Field of Search .................. 137/551, 557; 251/67, 251/68; 200/81.5, 81 R, 82 R

[56] References Cited

U.S. PATENT DOCUMENTS

| | | | |
|---|---|---|---|
| 2,537,474 | 1/1951 | Mejean | 200/81.5 X |
| 3,089,507 | 5/1963 | Drake et al. | 251/68 X |
| 3,910,222 | 10/1975 | Metivier | 137/557 X |
| 3,952,691 | 4/1976 | Peltz et al. | 137/557 X |
| 4,074,096 | 2/1978 | Romanowski | 200/81.5 X |
| 4,212,004 | 7/1980 | Bensemann | 137/557 X |
| 4,289,039 | 9/1981 | Trunner et al. | 251/68 X |
| 4,501,293 | 2/1985 | Furlong et al. | 137/557 |
| 4,579,315 | 4/1986 | Kowalski | 251/67 |

*Primary Examiner*—Alan Cohan
*Assistant Examiner*—John A. Rivell
*Attorney, Agent, or Firm*—Hopgood, Calimafde, Kalil, Blaustein & Judlowe

[57] ABSTRACT

A pressure-driven fire-suppression valve wherein a single electrical switch is mechanically actuated by coaxially related first and second sealed piston components, which are compliantly loaded in the direction away from switch actuation. The first piston component is of lesser area and has its switch-actuating relation via abutment with the second (larger-area) piston component; this first piston component continuously responds to suppressant-charge pressure, via a pressure-fluid connection to the upstream valve chamber, i.e., to the upstream side of the closed position of the valve member (poppet). As long as this upstream-sensed pressure is above predetermined threshold, the compliant-load force will be overcome, and the switch will be mechanically actuated, but upon leakage below threshold, the mechanical actuation is released, for a change of state at the switch. The downstream side of the second piston component is of relative large area and is continuously exposed via a pressure-fluid connection to the downstream chamber of the valve; normally, the downstream chamber is at ambient atmospheric pressure, but upon suppressant-gas discharge, the downstream-chamber pressure is transiently elevated, enabling the second piston component to transiently add to the compliant-loading force and thus rapidly to terminate the actuated state of the switch.

6 Claims, 3 Drawing Figures

VALVE FOR FIRE SUPPRESSION

BACKGROUND OF THE INVENTION

The invention relates to quick-opening valve mechanism for release of pressurized gas to suppress a fast-developing fire or explosion, as from ignition of a hydrocarbon or the like fuel.

Valves of the character indicated and their environment of specific use are described in U.S. Pat. No. 4,579,315, which is incorporated herein by reference. In such valves, a piston or poppet-valve member is retained by mechanical-latch mechanism in its readiness condition, normally closing off pressurized liquified suppressant gas against release for fast discharge via a discharge port. Latch release is via short-displacement, low-friction, low-inertia direct action which is independent of the pressure differential across the valve member. Latch-release is electrically initiated in response to the output of a suitable detector, or latch release may be manually initiated.

In order to assure utmost effectiveness of one or a plurality of suppressant-charged valve systems of the character indicated, it is important to provide a telemetered or other remote indication, as by indicator-lamp illumination, (1) of the fact that suppressant-gas pressure may have leaked to a value below a predetermined threshold of fire-suppressing capability, and (2) of the fact of fire-suppressing discharge. The first of these facts need only be ascertained by a relatively slow-response device; but the second of these facts requires an extremely rapid response (in the order of a few milliseconds) so that if a first of a plurality of fire-suppressing valve discharges is insufficient to quench a detected fire (or if this first valve malfunctions and fails to discharge in response to a firing signal), a next-succeeding fire-suppressing valve system can be almost immediately enabled for firing-signal actuation.

BRIEF STATEMENT OF THE INVENTION

It is an object of the invention to provide an improved valve of the character indicated, lending itself to operation alone, or as one of a plurality of successively actuated like valves, should occasion demand.

It is a specific object to achieve the above object without reliance on pressure-operated means, other than locally operative pressures associated with the involved charge of liquified suppressant gas.

Another specific object is to achieve the above objects in a single pressure-responsive unit which will serve both for electrical indication of pressure-leakage below threshold and for virtually instantaneous reporting of a fire-suppressing valve discharge.

The invention in a preferred embodiment achieves these objects in a fire-suppressing valve construction of the character indicated, wherein a single electrical switch is mechanically actuated by coaxially related first and second sealed piston components, which are compliantly loaded in the direction away from switch actuation. The first piston component is of lesser area and has its switch-actuating relation via abutment with the second (larger-area) piston component; this first piston component continuously responds to suppressant-charge pressure, via a pressure-fluid connection to the upstream valve chamber, i.e., to the upstream side of the closed position of the valve member (poppet). As long as this upstream-sensed pressure is above predetermined threshold, the compliant-load force will be overcome, and the switch will be mechanically actuated, but upon leakage below threshold, the mechanical actuation is released, for a change of state at the switch. The downstream side of the second piston component is of relative large area and is continuously exposed via a pressure-fluid connection to the downstream chamber of the valve; normally, the downstream chamber is at ambient atmospheric pressure, but upon suppressant-gas discharge, the downstream-chamber pressure is transiently elevated, enabling the second piston component to transiently add to the compliant-loading force and thus rapidly to terminate the actuated state of the switch.

DETAILED DESCRIPTION

The invention will be illustratively described in detail in conjunction with the accompanying drawings, in which.

Figure 1:
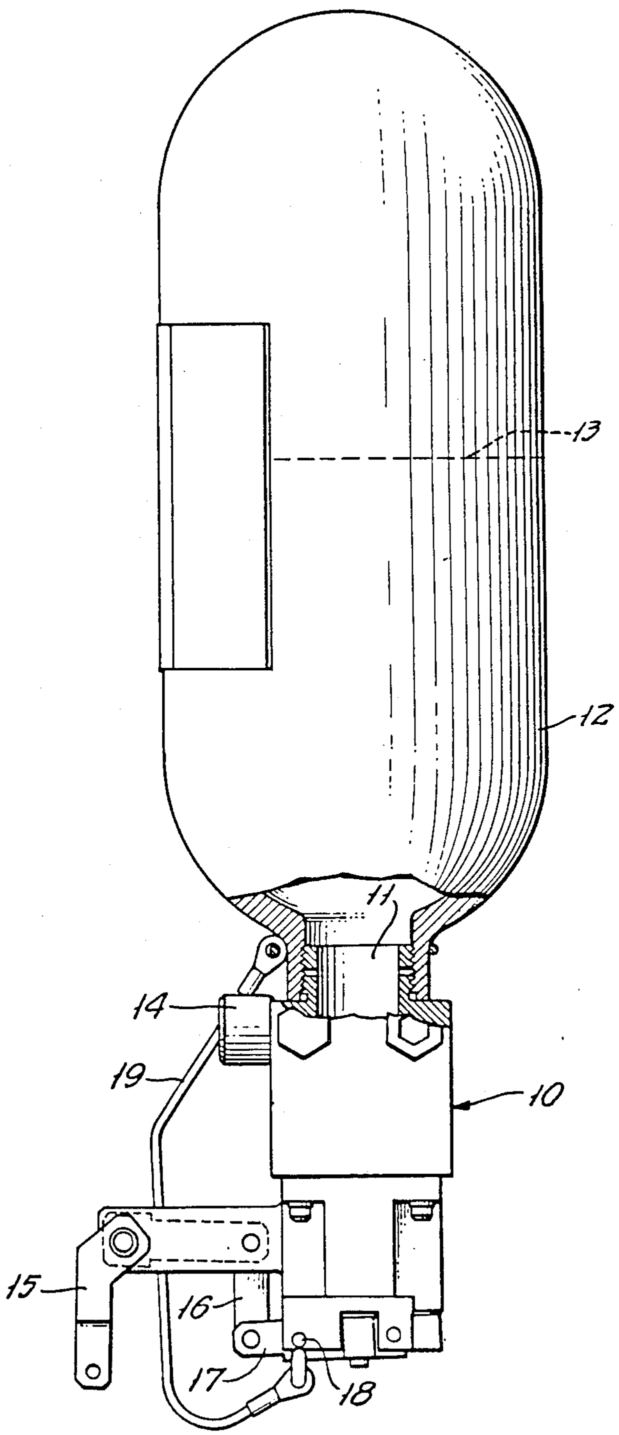
FIG. 1 is a simplified view in elevation of a fire-suppressing valve of the invention, in assembled relation to a charge bottle for containment of liquified-suppressant gas under pressure.

Referring initially to FIG. 1, the invention is shown in application to a valve 10 having an upwardly projecting threaded inlet port or chamber formation 11 via which a bottle 12 is mounted, in inverted condition, in readiness for rapid discharge (via an outlet port, not visible in FIG. 1) of pressurized liquified suppressant gas. Illustratively, the suppressant-liquid contents will be to a level suggested at 13, and the liquid may be a freon-based DuPont product known as Halon 1301. This suppressant is stored as a liquid, under pressure of a propellant gas such as nitrogen, and it rapidly proceeds to its gaseous state, upon discharge. A gauge 14 is externally viewable, to indicate the pressurized state of bottle contents. As will be explained below, the valve 10 is solenoid-actuated for discharge of bottle contents. And manual-override mechanism, including a bellcrank 15, link 16 and crank 17, is available for optional discharge of bottle 12. A removable lock-out pin 18 prevents inadvertent actuation of crank 17, and pin 18 is shown with flexible cable connection 19 to described structure, to avoid loss of pin 18, once it is removed from locking relation to crank 17.

Figure 2:
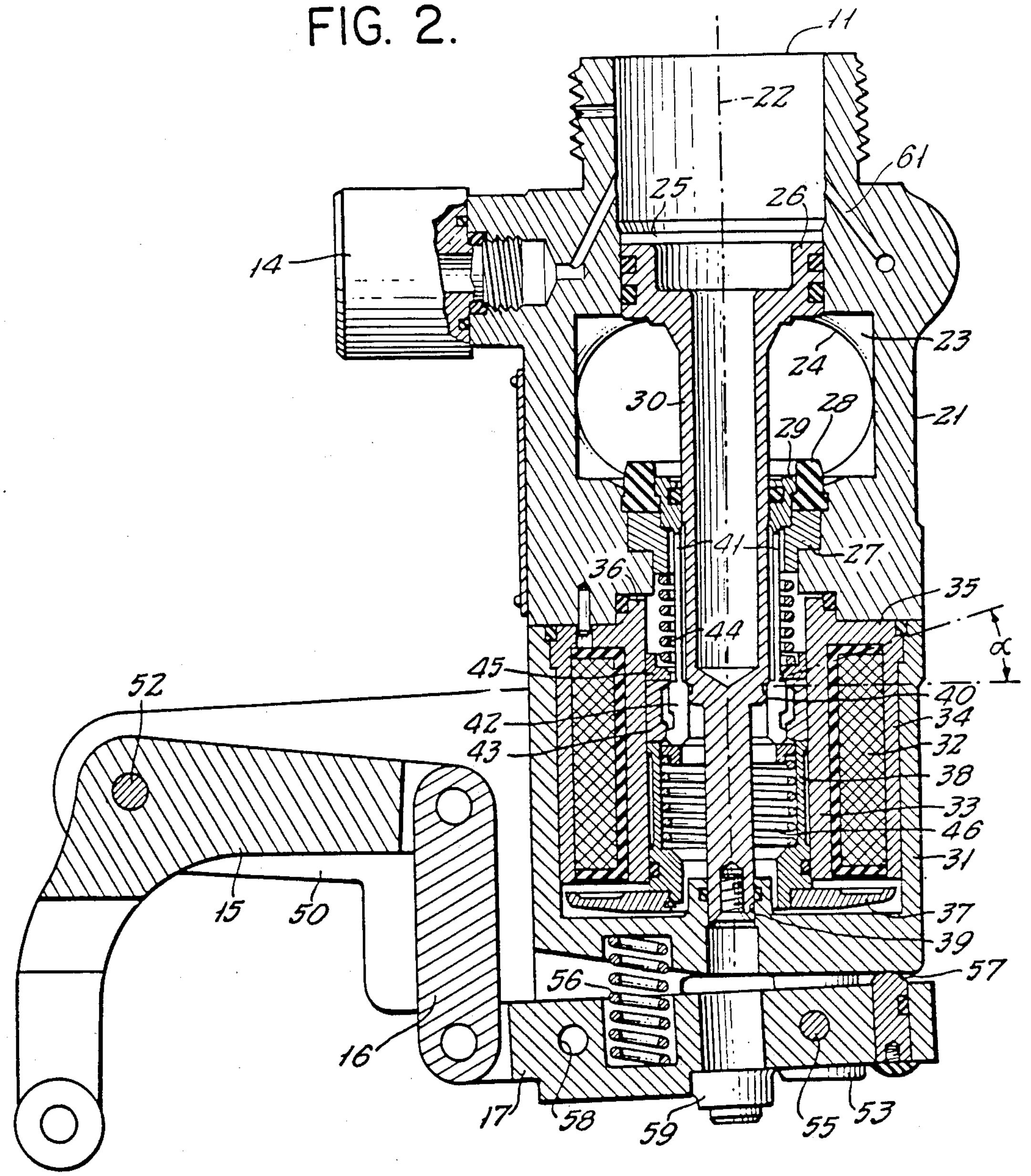
FIG. 2 is an enlarged vertical sectional view through the valve of FIG. 1.

Referring now to FIG. 2, the valve of FIG. 1 is seen to comprise a body 21 having an elongate bore on a vertical axis 22, upon which inlet or upstream chamber 11 is centered. The bore is characterized by an enlarged generally central downstream chamber cavity 23 which communicates laterally with a large discharge port 24 of oval section. Between the upstream and downstream chambers 11–23, a smooth cylindrical land 25 receives and supports a cylindrical piston-valve member or poppet 26, and separate elastomeric O-rings in two spaced circumferential grooves of valve member 26 establish redundant sealing of pressurized suppressant fluid from chamber 23 when member 26 is in its normally closed upper position, as shown. Beneath chamber 23, the bore on axis 22 is counterbored to provide locating shoulders for a flange bushing 27 and for the flanged base of an annular snubber 28 of elastomeric material. The annular base ring of a collet 29 locates at a shoulder in bushing 27 and provides radial-piloting support for an elongate cylindrical surface of a valve-member stem 30, shown integrally formed with valve member 26 and longitudinally bored to minimize inertial lag in the pressure-response of valve member 26.

Body 21 is effectively extended by a cupped end-housing memer 31, bolted thereto and defining a cavity for containment and coaxial location of a solenoid winding 32, and a generally toroidal core associated therewith. This core is of magnetic flux-conducting material of high permeability; the core is seen to comprise inner and outer concentric annular legs 33–34 integrally connected by an upper radially extending annular leg 35 and concentrically fitted at 36 to a counterbore in the bottom face of body 21. The toroidal flux path of the solenoid is completed via short air gaps between lower ends of legs 33–34 and an annular armature plate 37, which derives axially slidable support from a sleeve-like armature stem 38, piloting on the cylindrical bore of the inner core leg 33. The reduced lower end of stem 30 pilots on a central bore 39 in the bottom-closure wall of end housing 31.

To retain the mechanically latched valve-closed position shown in FIG. 2, stem 30 is locally reduced at 40 to define a radially short but circumferentially continuous shoulder, having preferably a slope $\alpha$ in the order of 10° to a strictly radial plane, for cam purposes; and collet 29 is characterized by an angularly distributed plurality of elongate collet fingers 41. Each collet finger 41 has an enlarged lower end 41 which is radially displaceable by reason of compliant flexibility along the length of each finger 41. Inner contouring of each collet end 42 is characterized by a heel of slope $\alpha$ and engaged to the stem shoulder (adjacent reduction 40) when the collet end 42 is radially inwardly confined. A short sleeve 43, which is slidable on the bore of inner core leg 33, is shown positioned to provide such confinement, thereby preventing high pressure on the upstream side of valve member 26 from driving member 26 out of the normally closed position shown. A first coil spring 44, compressed between bushing 27 and a slidable ring 45, is retained in compressed condition by ring (45) abutment with radially outward shoulder portions of all collet ends 42; and sleeve 43 is poised for axially upward driving abutment with ring 45, relieving the same from shoulder abutment with collet ends 42, upon solenoid actuation. A second coil spring 46 is compressed between a shoulder of armature stem 38 and the lower finger ends of the collet, to assure against inadvertent opening of the valve in response to mechanical shock.

Solenoid actuation will be understood to involve excitation of winding 32 upon development of an output signal by an explosion detector (not shown). Solenoid winding excitation causes armature plate 37 to close gaps to core legs 33–34, thus driving sleeve stem 38 to upwardly displace sleeve 43 with respect to collet ends 42. By reason of this displacement, upper and lower lands in the bore of sleeve 43 are no longer positioned to retain collet ends 42 in radially inward confinement, so that collet ends 42 may radially outwardly shift in quick response to axially downward gas-pressurized force on valve member 26 (aided by outward cam action via the engaged slopes $\alpha$), thus freeing valve member 26 for gas-powered descent and impact with snubber 28. The valve is immediately opened and depressant gas discharged laterally via port 24.

It has been generally indicated that external mechanism 15–16–17 provides a manually or otherwise actuated release of the latch action between sleeve 43 and collet ends 42. More specifically, end housing 31 is shown to integrally include side arms 50–51 for pinned support (at 52) of bellcrank 15 therebetween, as well as integral lugs or trunions 53–54 for pinned support (at 55) of crank 17 therebetween. A compressed spring 56 constantly urges crank 17 to the position shown in FIG. 2, the same being limited by a tail stop 57 on crank 17. A transverse hole 58 in crank 17, laterally outward of spring 56, provides access for reception of the locking pin 18 described in connection with FIG. 1.

In accordance with the invention, a single pressure-operated unit 60 (FIG. 3) is fitted to a bore in the body 21 of valve 10, with separate pressure connections 61–62 to the respective upstream and downstream chambers 11–23, and unit 60 is in such mechanical actuating relation with an electrical switch 63 as to serve the dual independent functions (1) of causing a change of state of switch 63 in the event that suppressant-charge pressure in bottle 12 (and in upstream chamber 11) leaks to a level less than a predetermined value, and (2) of transiently causing the same change of state of switch 63 in the event of a gas-discharging operation of the valve.

Specifically, unit 60 is a preassembled subassembly contained within or otherwise united to a machined generally tubular body 64 having a progressively stepped external contour whereby a succession of elastomeric O-rings 65–66–67 may sealingly isolate pressure-fluid conditions at three axially spaced regions 68–69–70 of circumferential manifolding coaction between body 64 and the valve-body (21) bore in which unit 60 is received; between regions 68–69, machined frusto-conical concave and convex surfaces establish a circumferentially continuous seating engagement of body 64 within this valve-body bore. Unit 60 is secured in this valve-body bore, via thread engagement at 71, and the indicated seating engagement effectively provides a degree of sealing redundancy, i.e., beyond the sealing efficacy of elastomeric ring 65, for pressure isolation as between regions 68–69. Unit 60 becomes fully enclosed when the cupped end-housing member 31 is bolted to body 21, with an elastomeric O-ring 72 compressed between shoulder formations of member 31 and body 64. A cup-shaped bushing 73 is fixedly mounted at threads 74 and sealed at 75 to the bore of body 64; bushing 73 is the means of fixedly mounting the switch assembly 63, with its actuator button 76 in axially confronting relation with piston components of unit 60.

A first and relatively small-area piston 80 is axially guided by its stem 81, within a central bore at the reduced axially inner end of body 64; a bellows 82 spans any axial gap G between the head end of piston 80 and the reduced end of body 64, thus assuring that current upstream-chamber (11) pressure will always be applied (via 61–68) only over the head end of piston 80, i.e., in the direction to urge piston 80 toward switch button 76. Bellows 82 is of metal and provides an axially compliant displacement-resisting force, i.e., in opposition to any pressure-driven displacement of piston 80.

A second and relatively large-area piston may be of a single-piece construction but is shown to comprise two parts: a cup-shaped piston part 85 which carries a circumferential gland 86 for sealed axial displacement in a counterbore of body 64, and a headed stem part 87 which seats within and at the closed end of part 85. The stem part 87 coaxially retains a compressionally loaded spring 88 reacting between the fixed bushing 73 and the head of stem part 87, thus continuously urging piston part 85 toward the limiting position shown in FIG. 3, namely, limited by abutment with the inner reduced-end wall of body 64. Plural radial venting passages 89 in body 64, in the region between seals 65–66, communicate with manifold 69, which in turn is vented at 89' to ambient air.

Figure 3:
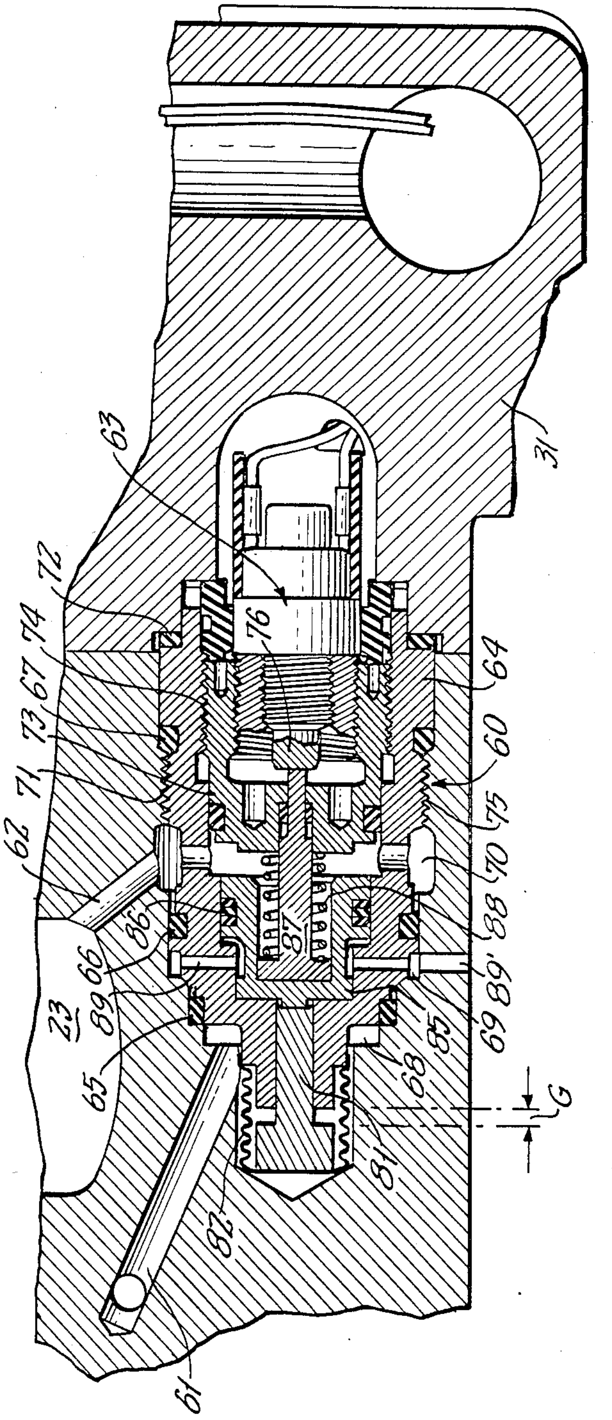
FIG. 3 is an enlarged fragmentary longitudinal section through pressure-operated switch-actuating mechanism incorporated in the valve of FIGS. 1 and 2.

In FIG. 3, the parts are shown in their unactuated positions, i.e., there is no charge of gas pressure operative on piston 80, and the downstream-chamber pressure at 23–62–70 (and therefore over the large effective tail-end area of piston 85) is that of ambient air. The stem 81 of piston 80 is poised for pressure-driven abutment with the head end of piston 85 and thus, via stem part 87, with the switch-actuating button 76. Only when there is a sufficiently loaded threshold pressure (e.g., 350 psi) in bottle 12 will piston 80 be able to displace piston parts 85–87, to the extent G, against reacting compliant opposition of spring 88 and bellows 82; in the course of making this displacement, switch 63 is actuated. Thus, only when this threshold is exceeded, will it be possible to achieve an actuated change of state at switch 63. And if the bottle pressure should dissipate to below threshold, as by leakage, the preload force of spring 88 will return the piston elements and therefore the switch button 76 to their unactuated positions. The described switch operation, in monitoring of bottle pressure with respect to the predetermined pressure threshold, is thus a first mode of pressure-operated actuation of switch 63.

The structure of FIG. 3 also serves for a second mode of pressure-operated actuation of the switch 63. In this second mode, the switch 63 will be in its actuated condition (button 76 depressed, meaning an adequate above-threshold charge in bottle 12), at the instant when the fire detector (not shown) has issued an excitation signal to the solenoid 32, whereupon the poppet valve is released and driven to full-open position. A transient rise in pressure quickly ensues in the downstream chamber 23 (and therefore also over the relatively large effective tail-end area of piston part 85); this transient pressure, integrated over this effective tail-end area, develops a relatively large transient force which acts on the piston part 85 in aid of the noted spring force, to overwhelm any static-friction and inertial opposition, whereby the piston parts 85–87–80 are almost explosively propelled in the direction of returning switch 63 to its unactuated condition. The measure of the speed of this transient response can be appreciated from the fact that, in the context of an initially stated design objective of 5 milliseconds with which to achieve return of switch 63 to its unactuated state (once initial poppet-opening displacement commences), the described structure operates more than twice as fast, namely, within 2 milliseconds.

The disclosed embodiment of the invention will be seen to meet all stated objects. Not only does the pressurized-gas charge drive the valve to open position, once the stem latch is released, but the transient appearance of discharging-gas pressure at the downstream chamber of the valve is used to almost explosively return the telemetering switch 63 to its unactuated state. And it should not be overlooked that the same telemetering switch will have served for indicating a sufficient gas-pressure charge (above threshold), continuously up to the time of releasing the valve latch.

Although the invention has been described in detail for a preferred embodiment, it will be understood that modifications may be made without departing from the scope of the invention. For example, the fact that three separate piston parts 80–85–87 have been shown and described in connection with FIG. 3 does not indicate that the piston means is necessarily in three parts. Actually, all these three parts move and are actuated for the same displacements, in that they move in unison and could therefore conceivably be embodied in a single part. The important point is that the effective area of the head end (80) of the piston means is small compared with the substantially larger effective area of the tail end (85) of the piston means, and that circumferential seals be established to localize a circumferential venting manifold between the communication of upstream-chamber pressure exclusively to the head end (80) and downstream-chamber pressure exclusively to the tail end (85). The area relation between head and tail ends (80–85) is suitably in the range 1:1.28 to 1:4.

What is claimed is:

1. In a fire-suppressing valve wherein a valve member is normally poised in valve-closed position to retain a high-pressure suppressant charge in an upstream chamber in readiness for rapid discharge via a downstream chamber upon quick-opening displacement of the valve member, the improvement in which said valve carries an electrical switch which exhibits a change of switching state in response to mechanical displacement of an actuating element between an unactuated position and an actuated position, and fluid-pressure-responsive movable-piston means operatively associated with the actuating element of said switch, said piston means having a relatively small-area head end connected for exclusive response to upstream-chamber pressure and a relatively large-area tail end connected for exclusive response to downstream-chamber pressure, venting means interposed between said head and tail ends, first seal means isolating said venting means from said head end and therefore isolating said head end for exposure to upstream-chamber pressure, and second seal means isolating said venting means from said tail end and therefore isolating said tail end for exposure to downstream-chamber pressure.

2. The improvement of claim 1, wherein said movable piston means is spring-loaded in the direction of relieving the actuated position of said switch.

3. The improvement of claim 1, wherein the effective ratio between said head and tail ends is in the range 1:1.28 to 1:4.

4. The improvement of claim 1, wherein said switch and movable-piston means are components of a unit-handling subassembly carried within and by a generally tubular body having means for threaded mounting engagement to a bore in the body of the fire-suppression valve.

5. The improvement of claim 4, in which said generally tubular body has a relatively large-diameter bore portion in which said tail end has sealed axially slidable engagement, said tubular body having a reduced-diameter end in which said head end is axially movable.

6. The improvement of claim 5, in which a metal bellows having an axially compliant annular portion connects said head end to the reduced-diameter end of said tubular body.

* * * * *